(12) United States Patent
Katakura et al.

(10) Patent No.: US 6,625,533 B2
(45) Date of Patent: Sep. 23, 2003

(54) VEHICLE DRIVE FORCE CONTROL

(75) Inventors: Shusaku Katakura, Yokosuka (JP); Daisuke Yoshinoya, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 13 days.

(21) Appl. No.: 09/984,702

(22) Filed: Oct. 31, 2001

(65) Prior Publication Data

US 2002/0065596 A1 May 30, 2002

(30) Foreign Application Priority Data

Nov. 29, 2000 (JP) ........................ 2000-363119

(51) Int. Cl.[7] .................... F02D 41/00; F16H 59/00
(52) U.S. Cl. ..................... 701/54; 701/55; 123/361
(58) Field of Search ............... 701/54, 55, 64; 123/361, 399; 477/109, 110, 115, 43, 46

(56) References Cited

U.S. PATENT DOCUMENTS

| | | | | |
|---|---|---|---|---|
| 5,413,540 A | * | 5/1995 | Streib et al. ............ | 477/43 |
| 5,613,920 A | * | 3/1997 | Uno et al. ............... | 477/109 |
| 5,785,627 A | * | 7/1998 | Uno et al. ............... | 477/109 |
| 5,826,208 A | * | 10/1998 | Kuroiwa et al. ........ | 701/54 |
| 6,024,670 A | * | 2/2000 | Kitagawa et al. ....... | 477/109 |
| 6,095,117 A | * | 8/2000 | Minowa et al. ......... | 123/399 |

FOREIGN PATENT DOCUMENTS

JP 1-206144 8/1989

* cited by examiner

*Primary Examiner*—Tan Q. Nguyen
*Assistant Examiner*—Dalena Tran
(74) *Attorney, Agent, or Firm*—Foley & Lardner

(57) ABSTRACT

The upshift and downshift timing of an automatic transmission (5) is set with a predetermined hysteresis in response to the vehicle speed and the depression amount of the accelerator pedal (25). When the accelerator pedal (25) is depressed in a hysteresis region before a downshift, the output torque of the automatic transmission (5) is saturated before the depression amount takes a maximum value. As a result, even when depressing the accelerator pedal (25) further, increases do not result in the output torque of the automatic transmission (5). When the depression amount is less than a predetermined value, this invention sets the rate of increase in the target output torque of the automatic transmission (5) to a value which is smaller than the rate of increase when the depression amount is greater than the predetermined value. Thus saturation of the output torque of the automatic transmission (5) can be prevented by controlling the engine output based on the target output torque determined in this manner while the rate of increase in the drive force when the accelerator pedal (25) is deeply depressed can be maintained.

7 Claims, 10 Drawing Sheets

VEHICLE DRIVE FORCE CONTROL

FIELD OF THE INVENTION

This invention relates to engine output control for a vehicle provided with an automatic transmission.

BACKGROUND OF THE INVENTION

Tokkai Hei 1-206144 published by the Japanese Patent Office in 1989 discloses a hysteresis region provided in the upshift and downshift timing for an automatic transmission of a vehicle.

The shift timing of the automatic transmission is determined using the vehicle speed and the depression amount of the accelerator pedal as parameters. However when these parameters repeatedly fluctuate across the shift timing, the automatic transmission repeats a shift operation which results in a chattering phenomenon. The hysteresis region above has the function of preventing such chattering.

The operation of the hysteresis region allows a shift from a second gear to a third gear during acceleration for example to be performed at a greater vehicle speed than a shift from a third gear to a second gear during deceleration.

SUMMARY OF THE INVENTION

The drive force of a vehicle, that is to say, the output torque of the automatic transmission has an upper limit according to the gear ratio that the transmission applies.

For example, the upper limiting value of the output torque in the third gear is smaller than the upper limiting value of the output torque in the second gear. Thus even the accelerator pedal is depressed in a hysteresis region immediately before the automatic transmission shifts from the third gear to the second gear during deceleration, the output torque of the automatic transmission only increases to the upper limiting value in the third gear.

In other words, after the output torque of the automatic transmission reaches the upper limiting value, the output torque does not increase even with further depression of the accelerator pedal. In the following description, this state is termed saturation of output torque. Saturation of output torque causes the driver to feel that acceleration is not sufficient. Furthermore even when output torque is saturated, the driver will often attempt to increase the output torque by depressing the accelerator pedal further. As a result, there is a tendency for the throttle to become fully open when this is not required. When the throttle is fully open, fuel consumption by the engine increases and as a result exhaust emission performance deteriorates.

On the other hand, in the second gear, it is possible to obtain an output torque which is larger than the third gear. In order to solve the above problems, therefore, it has been proposed to advance the timing of a downshift from the third gear to the second gear during deceleration. However advancing the downshift timing tends to cause chattering in the shift operation and obviates the reason for setting the hysteresis region.

It is therefore an object of this invention to avoid saturation of the output torque of an automatic transmission when the acceleration pedal is depressed.

It is a further object of this invention to ensure the rate of increase of output torque of an automatic transmission when the accelerator pedal is deeply depressed.

In order to achieve the above objects, this invention provides a vehicle drive system, comprising an accelerator pedal, a sensor which detects a vehicle speed, a sensor which detects a depression amount of the accelerator pedal, an engine varying output torque in response to a signal, and a stepwise automatic transmission connected to the engine. The transmission performs an upshift operation at an upshift timing set according to the depression amount and the vehicle speed and a downshift operation at a downshift timing set according to the depression amount and vehicle speed. The vehicle speed corresponding to the upshift timing is set to be larger than the vehicle speed corresponding to the downshift timing for an identical depression amount.

The system further comprises a programmable controller programmed to compare the depression amount with a predetermined depression amount, set a first target output torque to a transmission target output torque of the automatic transmission when the depression amount is smaller than the predetermined depression amount, set a second target output torque to the transmission target output torque of the automatic transmission when the depression amount is larger than the predetermined depression amount, calculate an engine target output torque based on the transmission target output torque, and output the signal corresponding to the engine target output torque to the engine. Herein, the first target output torque increases at a predetermined rate of increase as the depression amount increases. The second target output torque increases at a rate of increase larger than the predetermined rate as the depression amount increases.

The programmable controller may alternatively be programmed to store a map of the transmission target output torque set to decrease as the vehicle speed increases, determine from a variation in the vehicle speed whether or not a vehicle is accelerating, calculate a modified vehicle speed, when the vehicle is accelerating, by subtracting a predetermined amount from the vehicle speed, calculate the transmission target output torque by applying the modified vehicle speed to the map, calculate an engine target output torque based on the transmission target output torque, and output the signal corresponding to the engine target output torque to the engine.

The details as well as other features and advantages of this invention are set forth in the remainder of the specification and are shown in the accompanying drawings.

DESCRIPTION OF THE PREFERRED EMBODIMENTS

Figure 1:
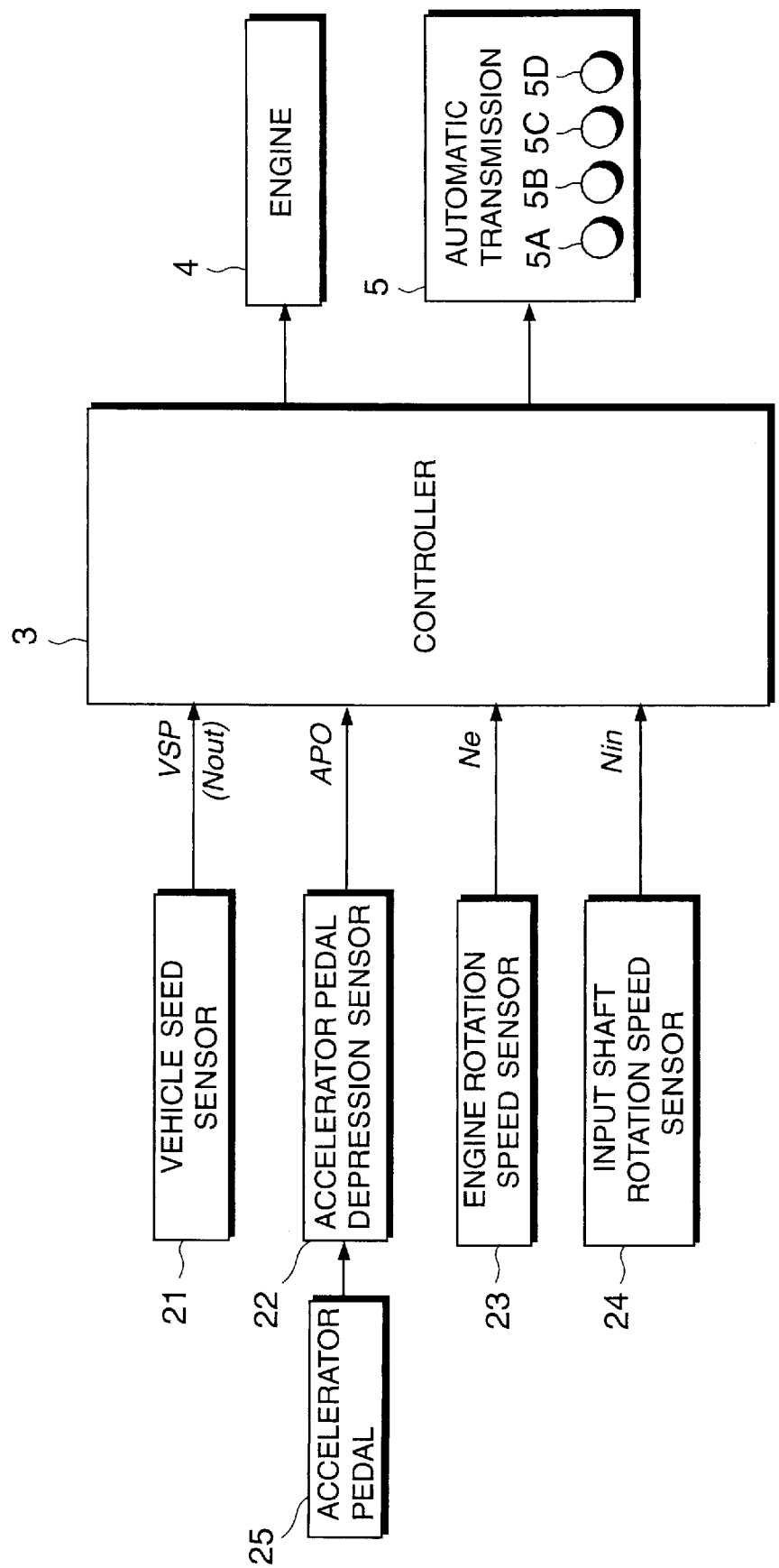
FIG. 1 is a block diagram showing the structure of a drive system for a vehicle according to this invention.

Referring to FIG. 1 of the drawings, a vehicle drive system is provided with an engine 4 and an automatic transmission 5 connected to the engine 4.

The automatic transmission 5 is provided with an input shaft for inputting the output force of the engine and an output shaft which is engaged to the drive system of the vehicle. The automatic transmission 5 has four gear settings, i.e., a first gear 5A, second gear 5B, third gear 5C and fourth gear 5D for driving the vehicle forward. These gear settings are selectively applied in response to signals from a controller 3. The first gear 5A is the so-called low gear and has the largest speed reduction ratio. The fourth gear 5D is the so-called top gear and has the smallest speed reduction ratio.

The rotation output of the engine 4 is input to the automatic transmission 5 through a torque converter. The controller 3 varies the output torque of the engine 4 by varying the ignition timing of the spark plugs provided in the engine 4, the throttle opening in the engine 4 and the fuel supply amount to the engine 4 in response to signals.

The controller 3 comprises a microcomputer or plural computers each of which is provided with a central processing unit (CPU), a read only memory (ROM), a random access memory (RAM) and an input/output interface (I/O interface).

Signals from a vehicle speed sensor 21 which detects a vehicle speed VSP, an accelerator pedal depression sensor 22 which detects a depression amount APO of an accelerator pedal 25 provided in the vehicle, an engine rotation speed sensor 23 which detects a rotation speed Ne in the engine 4 and an input rotation speed sensor 24 which detects an input rotation speed Nin of the automatic transmission 5 are input into the controller 3. Since the ratio of the vehicle speed VSP and the output shaft rotation speed Nout of the automatic transmission 5 is fixed, the output of the vehicle speed sensor 21 can also be used as an output shaft rotation speed Nout by multiplication with a predetermined constant K. The constant K is determined by a radius of tires of the vehicle and a gear ratio of a final gear which is interposed between the automatic transmission 5 and the tires.

Based on the signals input from these sensors, the controller 3 selects a gear to be applied by the automatic transmission 5 and controls the output torque of the engine 4.

Figure 2:
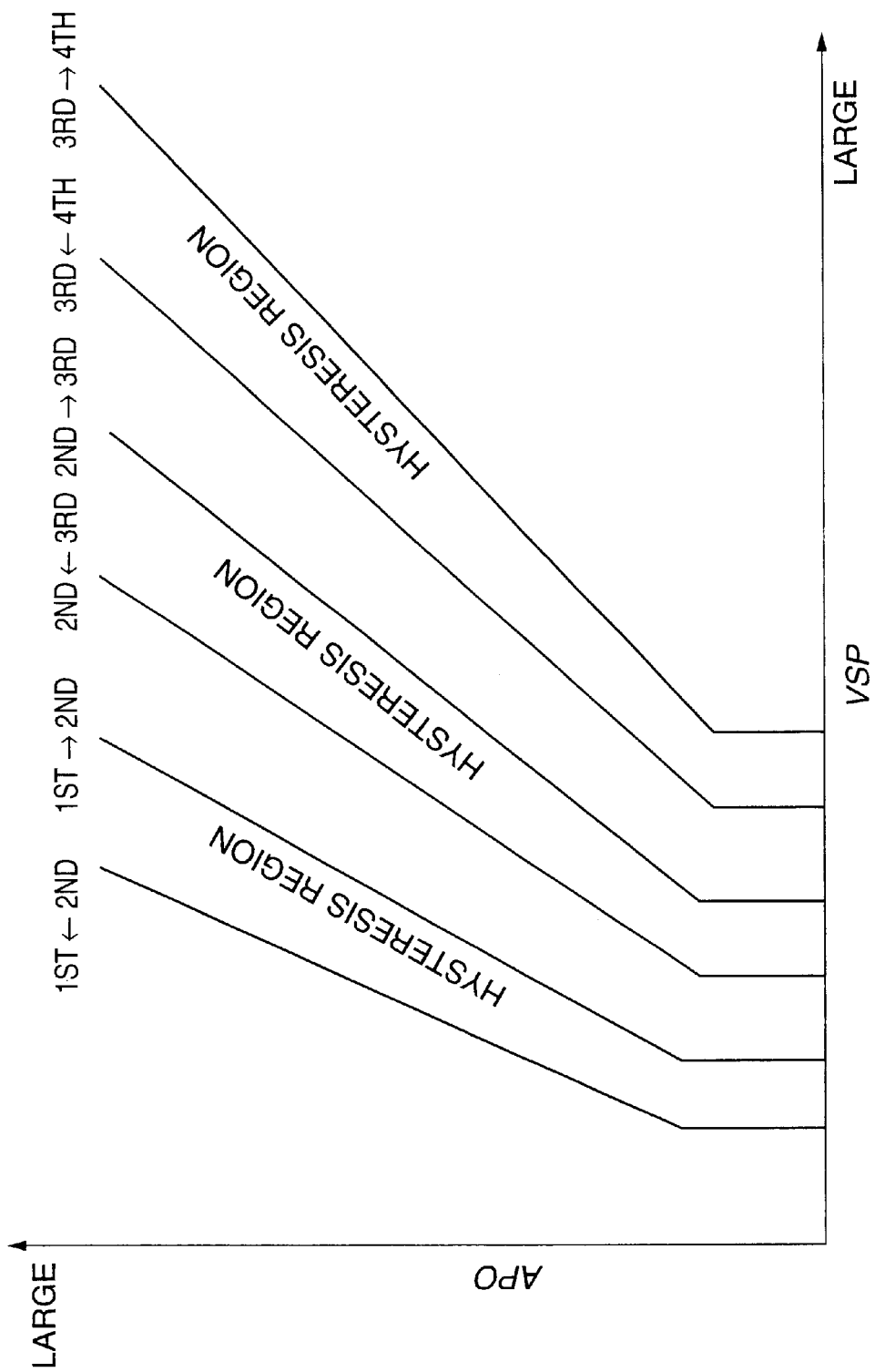
FIG. 2 is a diagram describing a map of shift timing of an automatic transmission stored in a controller according to this invention.

The controller 3 selects a gear to be applied by the automatic transmission 5 by looking up a map shown in FIG. 2 based on the vehicle speed VSP and the accelerator pedal depression amount APO. This map displays different characteristics during upshift and downshift of the automatic transmission 5. That is to say, at the same vehicle speed VSP, an accelerator pedal depression amount APO corresponding to a downshift operation between two arbitrary adjacent gears is greater than an acceleration depression amount APO corresponding to an upshift operation between the same two gears. In other words, a vehicle speed corresponding to an upshift operation between two arbitrary adjacent gears is greater than a vehicle speed corresponding to a downshift between the same two gears at the same accelerator pedal depression amount APO.

The differences in these characteristics correspond to the hysteresis in the upshift and the downshift. The controller 3 outputs a signal corresponding to the selected gear to the automatic transmission 5. The automatic transmission 5 performs a gear shift in response to this signal.

Figure 3A:
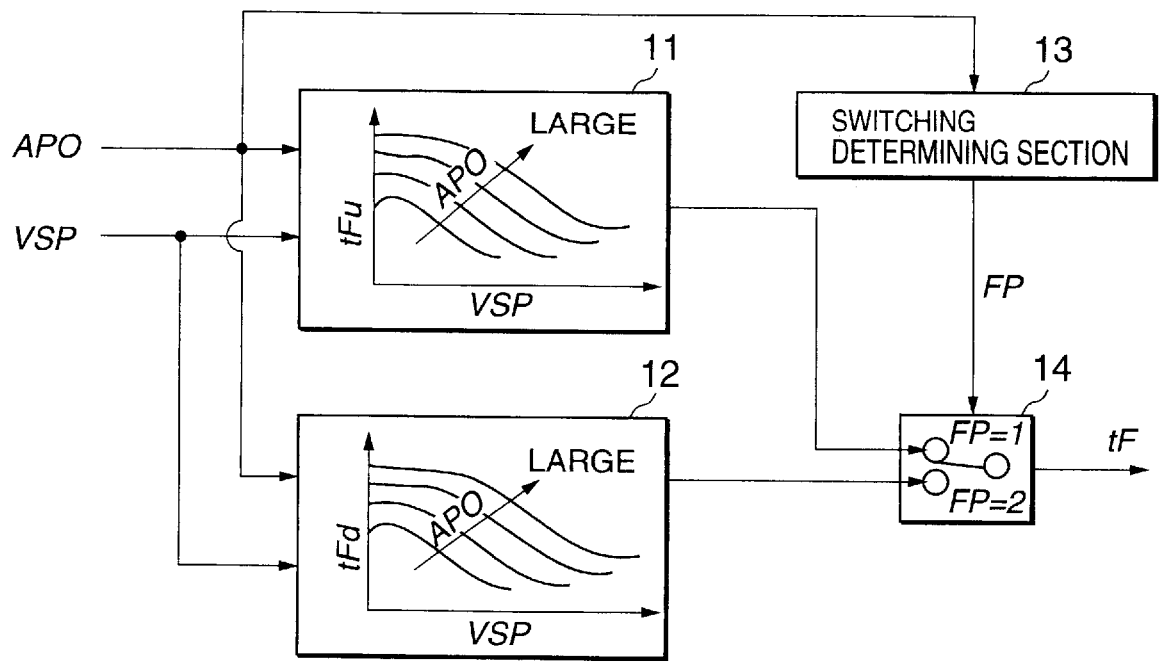
FIGS. 3A and 3B are block diagrams describing the process of engine output control performed by the controller.

On the other hand, the controller 3 sets a target output torque tF of the automatic transmission 5 by a process as shown in FIG. 3A.

That is to say, a target output torque tF for the automatic transmission 5 is calculated by respectively looking up two types of pre-stored maps 11 and 12 based on an accelerator pedal depression amount APO and a vehicle speed VSP. The map 11 applies a target output torque tFu during upshift and the map 12 applies a target output torque tFd during downshift.

Figure 5:
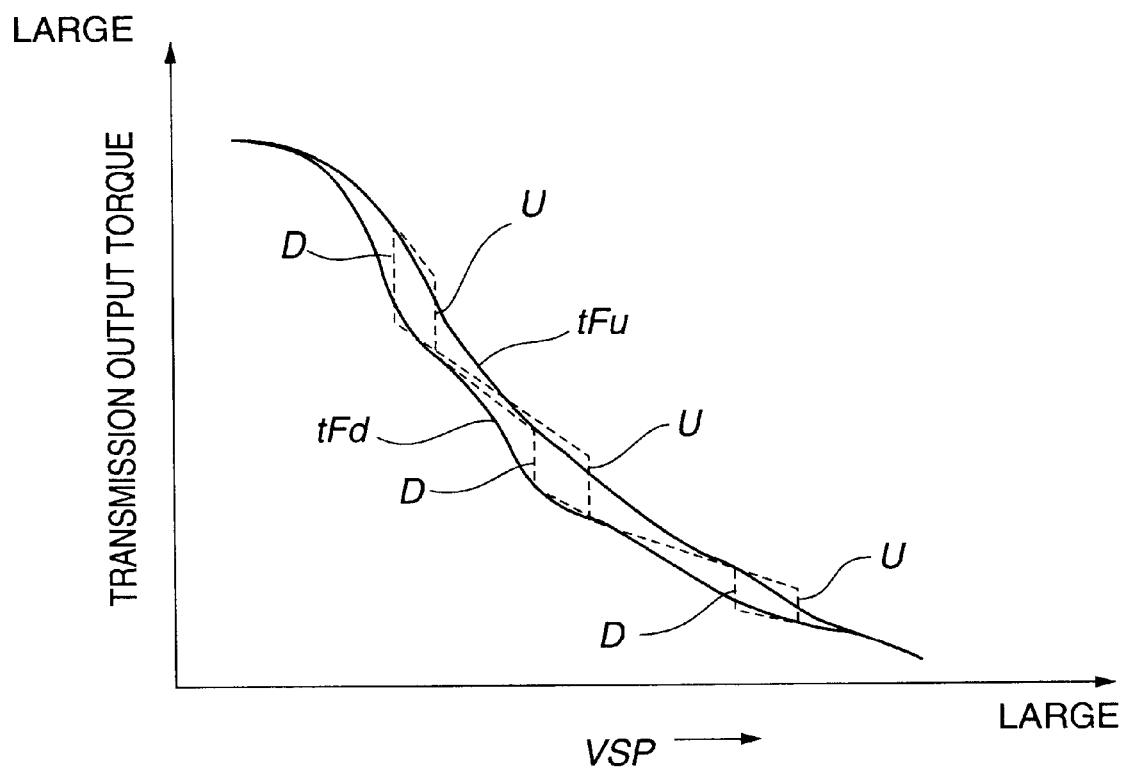
FIG. 5 is a diagram describing the characteristics of target output torque of the automatic transmission set by the controller.

FIG. 5 shows variation in the output torque of the automatic transmission 5 when the automatic transmission 5 performs a gear shift according to the map shown in FIG. 2 in response to the vehicle speed VSP at a fixed accelerator pedal depression amount APO. The broken line U in the figure shows fluctuations in the output torque of the automatic transmission 5 during an upshift when the relation of the acceleration pedal depression amount APO and the engine output torque is fixed. The broken line D shows fluctuations in the output torque of the automatic transmission 5 during a downshift when the relation of the acceleration pedal depression amount APO and the engine output torque is fixed. The target output torque tFu obtained from the map 11 interpolates the broken line U into a smooth curve. The target output torque tFd obtained from the map 12 interpolates the broken line D into a smooth curve. Thus when vehicle speed VSP is held equal at a certain accelerator pedal depression amount APO, the target output torque tFu applied by the map 11 is greater than the target output torque tFd applied by the map 12.

A switching determination section 13 in the controller 3 determines which of the values of the map 11 or 12 should be set as the target output torque tF based on the accelerator pedal depression APO and sets a switching flag FP corresponding to the determination result. The setting of the switching flag FP is performed by executing a switching flag setting routine as shown in FIG. 4.

Figure 4:
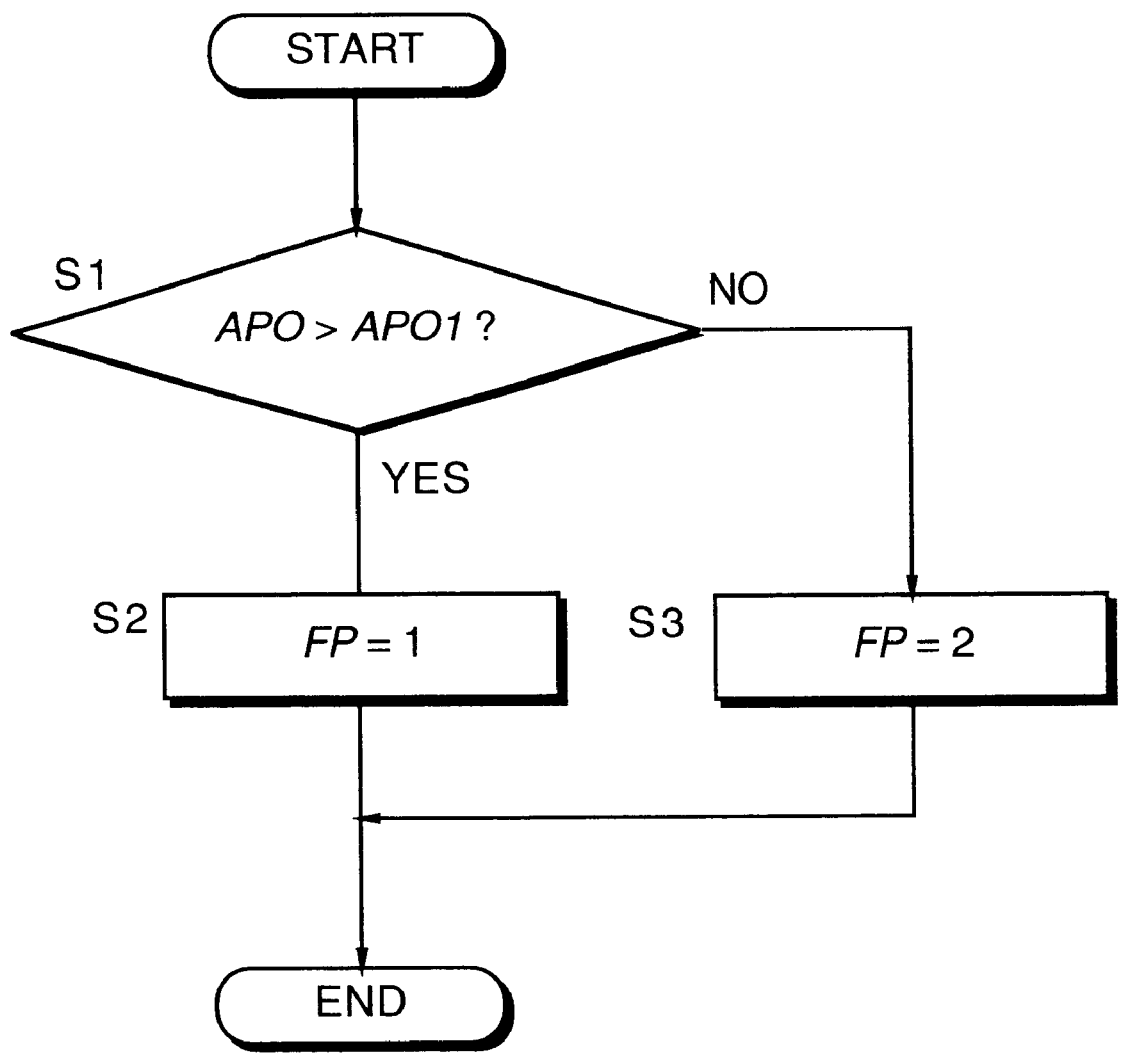
FIG. 4 is a flowchart describing a switch flag setting routine executed by the controller.

Referring to FIG. 4, in a step S1, the switching determination section 13 firstly determines whether or not the accelerator pedal depression amount APO is greater than a predetermined amount APO1. When APO is greater than APO1, the switching flag FP is set to a value of one in a step S2 and the routine is terminated. When APO is not greater than APO1, the switching flag FP is set to a value of two in a step S3 and the routine is terminated. The initial value of the switching flag FP is taken to be one. The predetermined amount APO1 is set to 4/8. It is possible to vary the predetermined amount APO1 in response to vehicle operational conditions such as vehicle speed VSP. A switching control section 14 in the controller 3 selects which of the maps 11 and 12 will be applied in control of engine torque in response to the switching flag FP set by the switching determination section 13. That is to say, when the switching flag FP has a value of one, a target output torque tFu applied by the map 11 is set to a target output torque tF. When the switching flag FP has a value of two, a target output torque tFd applied by the map 12 is set to a target output torque tF.

The controller 3 calculates a target engine torque tT from the target output torque tF of the automatic transmission 5 set by the switching control section 14.

Figure 3B:
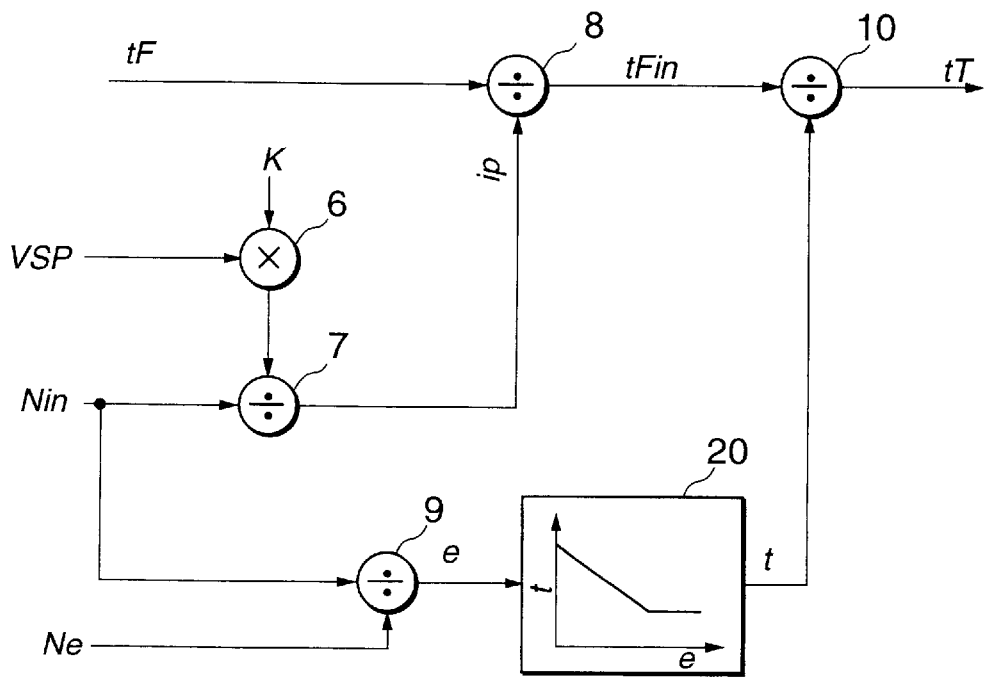

The calculation process of the target engine torque tT will be described hereafter referring to FIG. 3B.

The controller 3 firstly calculates an output shaft rotation speed Nout by multiplying a constant K by the vehicle speed VSP with a multiplier 6. Then the input shaft rotation speed Nin is divided by the output shaft rotation speed Nout with a divider 7 to calculate a real speed ratio ip of the automatic transmission 5. A slip rate e of the torque converter is calculated by dividing the input shaft rotation speed Nin by the engine rotation speed Ne with a divider 9. Consequently a torque amplification ratio t of the torque converter is calculated from the slip rate e of the torque converter by looking up a pre-stored map 20

The controller 3 converts the target output torque tF of the automatic transmission 5 set by the switching control section 14 into a target input torque tFin of the automatic transmission 5 by division with the real speed ratio ip in a divider 8. Then the controller 3 calculates the target engine torque tT of the engine 4 by dividing the target input torque tFin with the torque amplification ratio t in a divider 10.

The controller 3 controls the throttle opening in the engine 4, the fuel supply amount to the engine 4 and the ignition timing of spark plugs provided in the engine 4 based on the target engine torque tT calculated in the above manner. In this way, the controller 3 controls the output torque of the engine 4 to coincide with the target engine torque tT. An electronic throttle performing electronic control of the opening independently of the operation of the accelerator pedal 25 is used as the throttle provided in the engine 4.

As a result, in a hysteresis region immediately before a downshift from the third gear 5C to the second gear 5B, when the accelerator pedal 25 is depressed, the map 12 is used for calculation of the target drive force tF until the depression amount APO reaches a predetermined value APO 1. When the depression amount APO exceeds a predetermined value APO1, the map 11 is used for calculation of the target drive force tF. At the same accelerator pedal depression amount, the map 11 applies a target drive force tF which is larger than that of the map 12.

Figure 6:
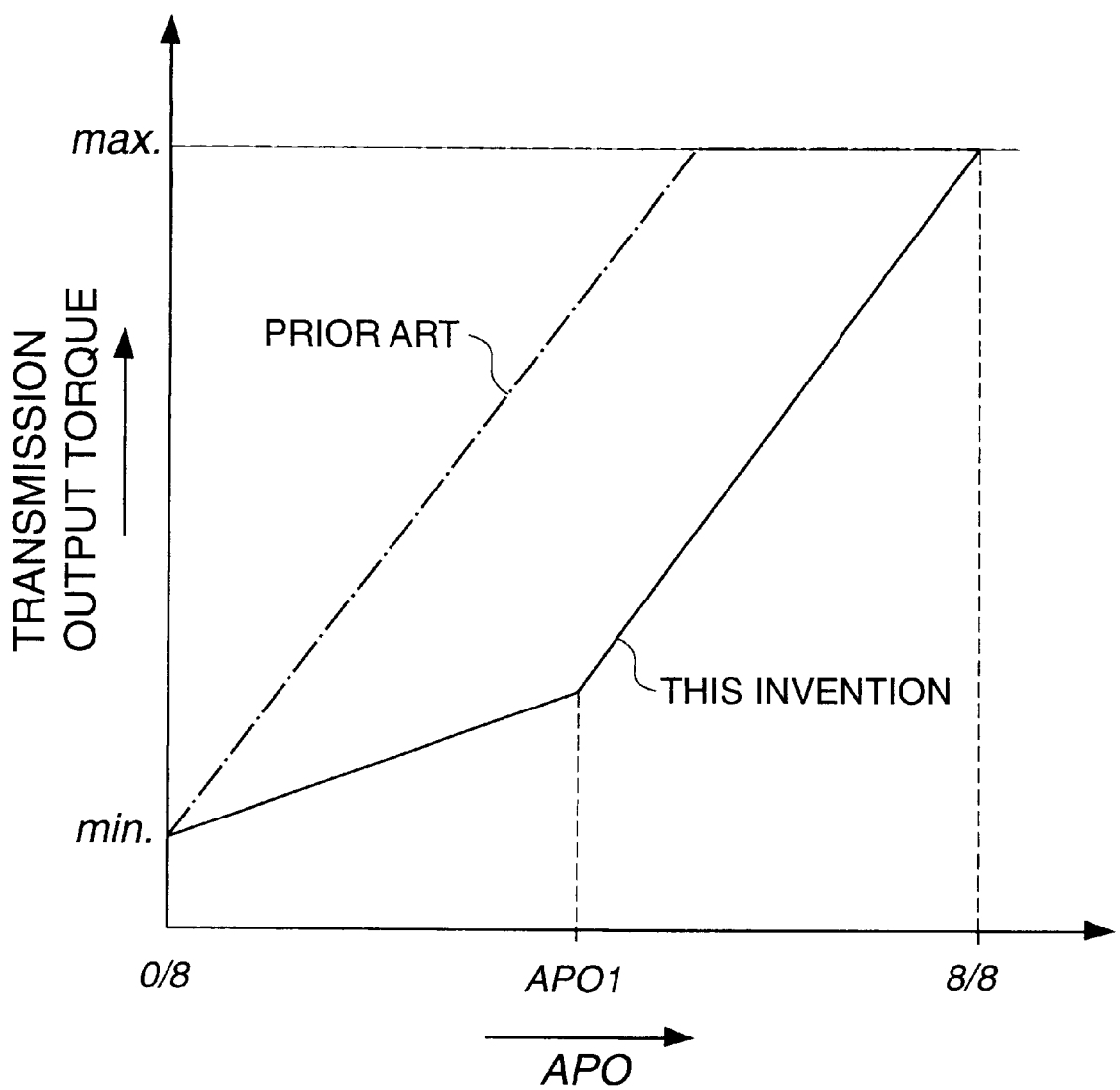
FIG. 6 is a diagram describing the variation in the output torque of the automatic transmission under the control by the controller.

Thus as shown in FIG. 6, the drive force of the vehicle increases with a small rate of increase in the first half of depression of the accelerator pedal 25, i.e., in a region in which APO is smaller than or equal to APO1. In the latter half of depression of the accelerator pedal 25, i.e., in a region in which APO is greater than APO1, the drive force of the vehicle increases with a large rate of increase. The overall rate of increase of the drive force is suppressed by applying a small rate of increase in the first half of depression of the accelerator pedal 25. As a result, until the accelerator pedal depression amount APO reaches a maximum value of 8/8, the output torque of the automatic transmission 5 is not saturated and acceleration characteristics are realized which do not give the driver an impression of deficient vehicle acceleration.

FIG. 6 shows the output torque of the automatic transmission 5 as a straight line with a sharp bend in order to facilitate description. However it is preferred that a smooth curve is applied instead of a bent straight line when applying the invention.

In this description, the multiplier 6, the dividers 7, 8, 9, 10, the switching determination section 13 and the switching control section 14 are all virtual units and do not have an existence independent the functions of the CPU, the ROM and the RAM discussed above. The maps 11, 12 and 20 are stored in the ROM.

Instead of calculating the target engine torque tT directly from the target output torque tF, it is preferable that a modified target output torque is calculated as a gently varying value by applying a first order delay filter. Thereafter the engine torque tT is calculated based on the modified target output torque.

Figure 7:
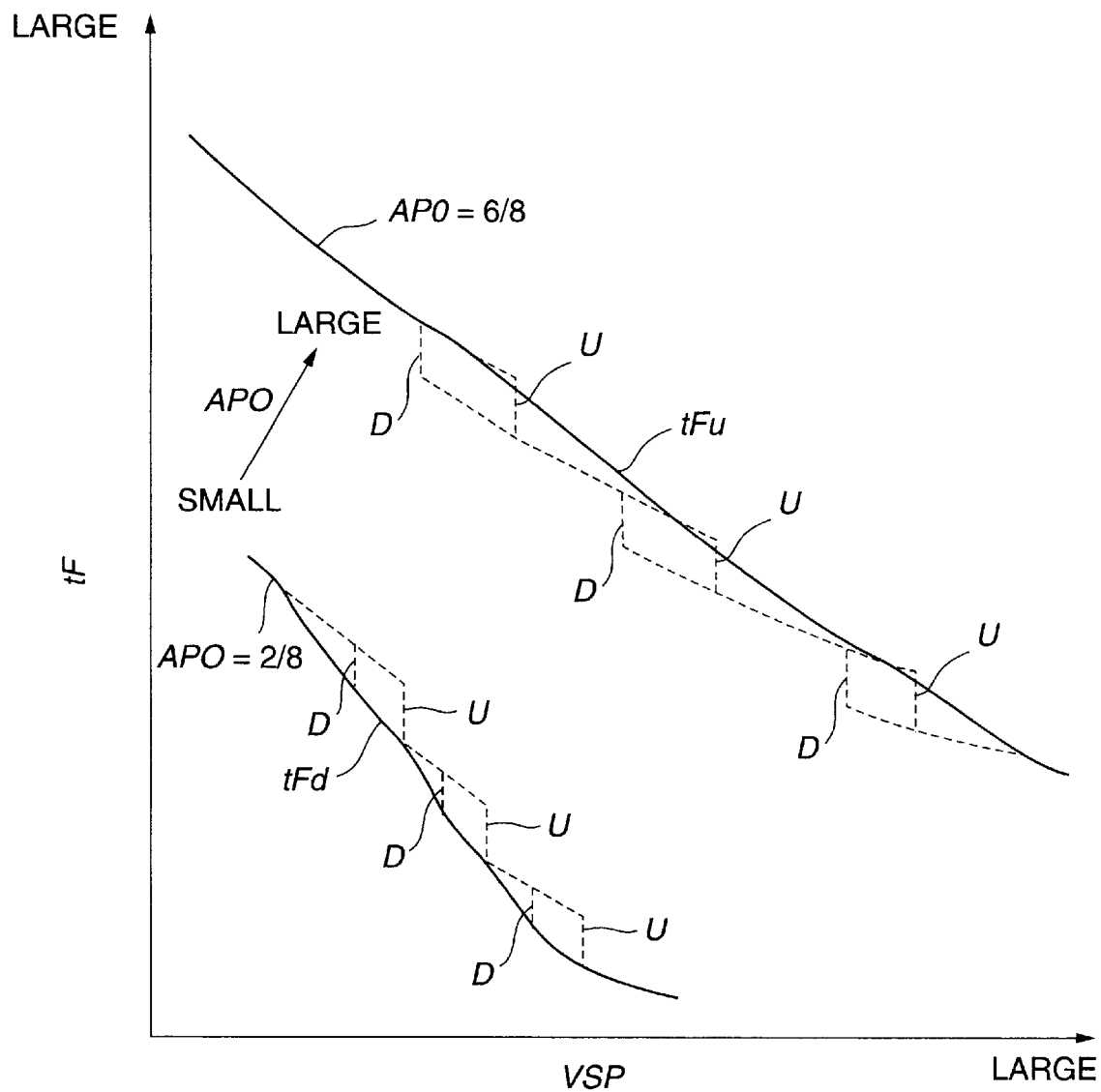
FIG. 7 is a diagram describing the characteristics of the target output torque of the automatic transmission set by a controller according to a second embodiment of this invention.

A second embodiment of this invention will now be described with reference to FIGS. 7 and 8.

Figure 8:
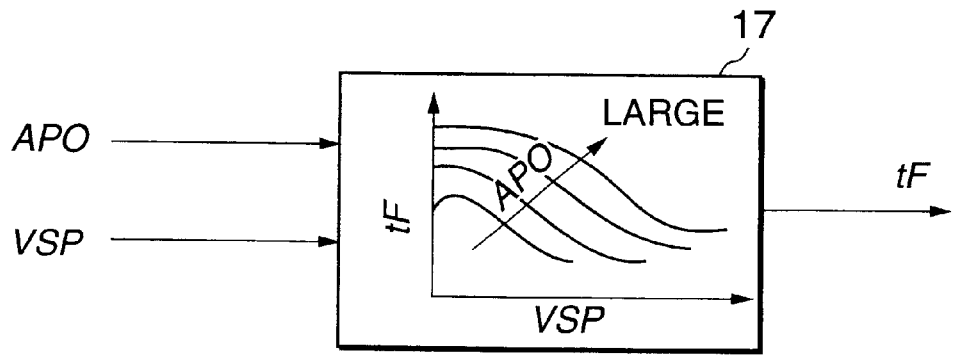
FIG. 8 is a block diagram describing the setting process of a target engine output tF set by the controller according to the second embodiment of this invention.

Instead of using two types of maps 11 and 12 which depend on an accelerator pedal depression amount APO, a single type of map 17 is used in this embodiment irrespective of the accelerator pedal depression amount APO as shown in FIG. 8.

In the map 17, the characteristics of the target drive force are varied in response to the accelerator pedal depression amount APO so that when the accelerator pedal depression amount APO has a large value, the characteristics of the map 11 are applied and when the accelerator pedal depression amount APO has a small value, the characteristics of the map 12 are applied.

These characteristics will be described in detail with reference to FIG. 7. For example, when the accelerator pedal depression amount APO has a value of 2/8, the characteristics of the target output torque tFd that is equivalent to the map 11 are applied. When the accelerator pedal depression amount APO has a value of 6/8, the characteristics of the target output torque tFu that is equivalent to the map 12 are applied. In the map 17, the target output torque tF is gradually varied from a target output torque tFd to tFu corresponding to increases in the accelerator pedal depression amount APO.

This setting means that when the accelerator pedal depression amount APO is small, the rate of increase in the output torque of the automatic transmission 5 is small and as the accelerator pedal depression amount APO increases, the rate of increase in the output torque of the automatic transmission 5 becomes large. The rate of increase in the output torque of the automatic transmission 5 is suppressed when the accelerator pedal depression amount APO is small. Therefore even when depressing the accelerator pedal 25 is for example in a hysteresis region immediately before the downshift from the third gear 5C to the second gear 5B, the vehicle drive force is not saturated during depressing of the accelerator pedal 25. Furthermore since the rate of increase in the output torque of the automatic transmission 5 increases as the depression amount of the accelerator pedal 25 becomes larger, performance characteristics are obtained which do not tend to give a driver the impression of deficiencies in acceleration.

According to this embodiment, it is not necessary to prepare a plurality of maps. Furthermore the control routine is simplified as the setting routine for the switching flag FP in FIG. 4 is omitted.

A third embodiment of this invention will be described with reference to FIGS. 9 to 11.

Figure 9:
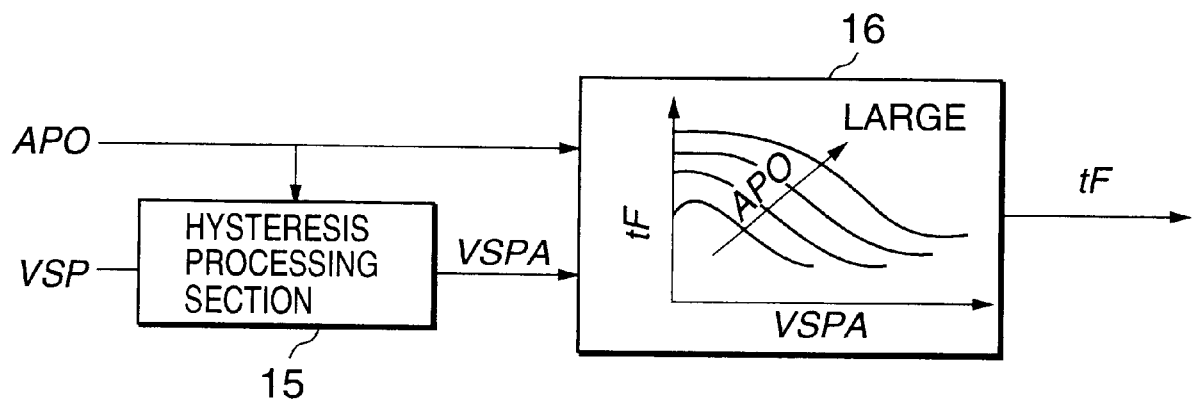
FIG. 9 is similar to FIG. 8, but showing a third embodiment of this invention.

Firstly referring to FIG. 9, a map 16 is used in this embodiment instead of the map 17 in the second embodiment. Furthermore a hysteresis processing section 15 is provided in the controller 3.

The map 16 uses a modified vehicle speed VSPA taking consideration of the hysteresis instead of the vehicle speed VSP. The modified vehicle speed VSPA is calculated by executing the calculation routine as shown in FIG. 10 in a hysteresis processing section 15.

Figure 10:
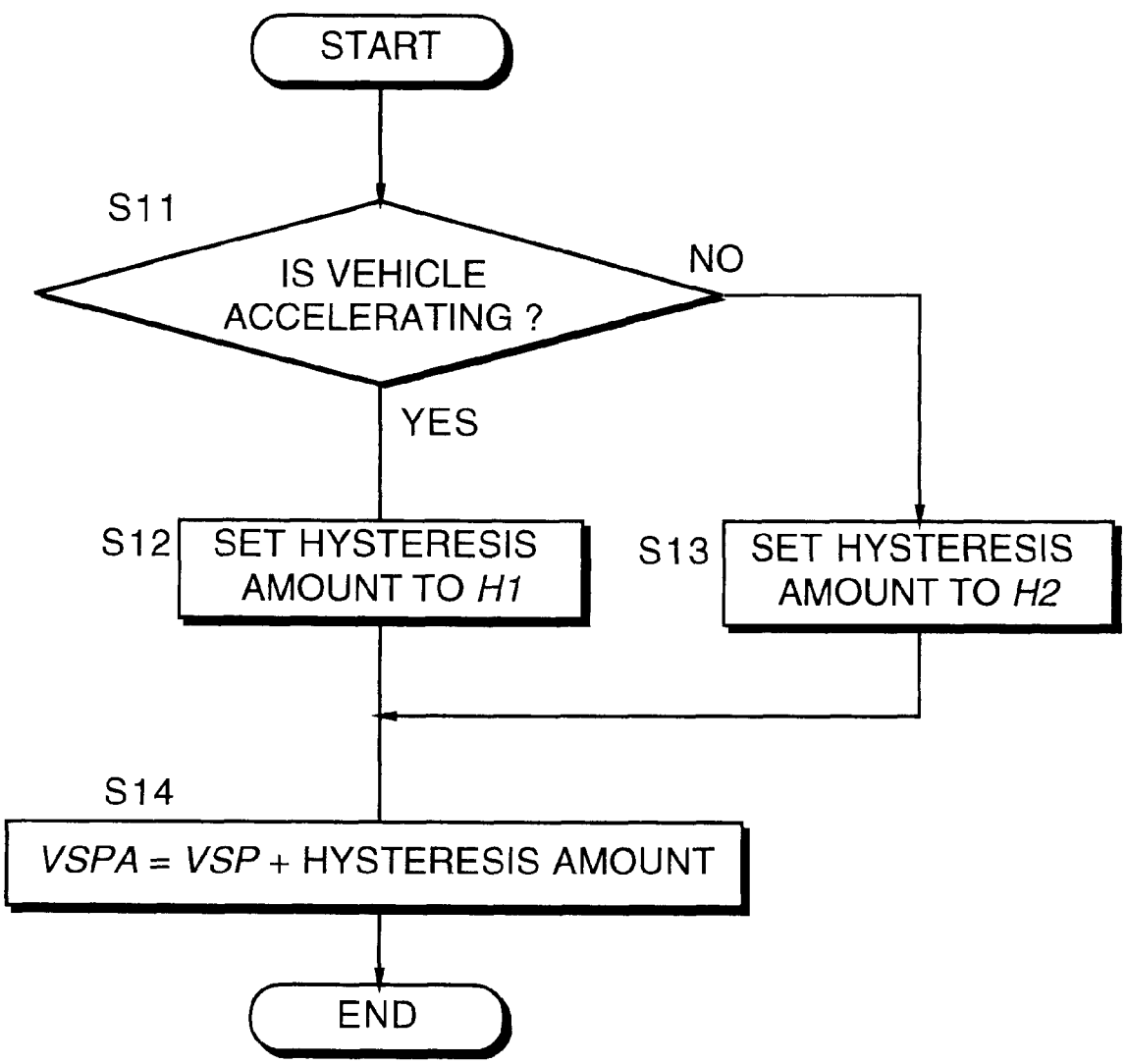
FIG. 10 is a flowchart describing a calculation routine for a modified vehicle speed VSPA executed by a controller according to the third embodiment of this invention.
Figure 11:
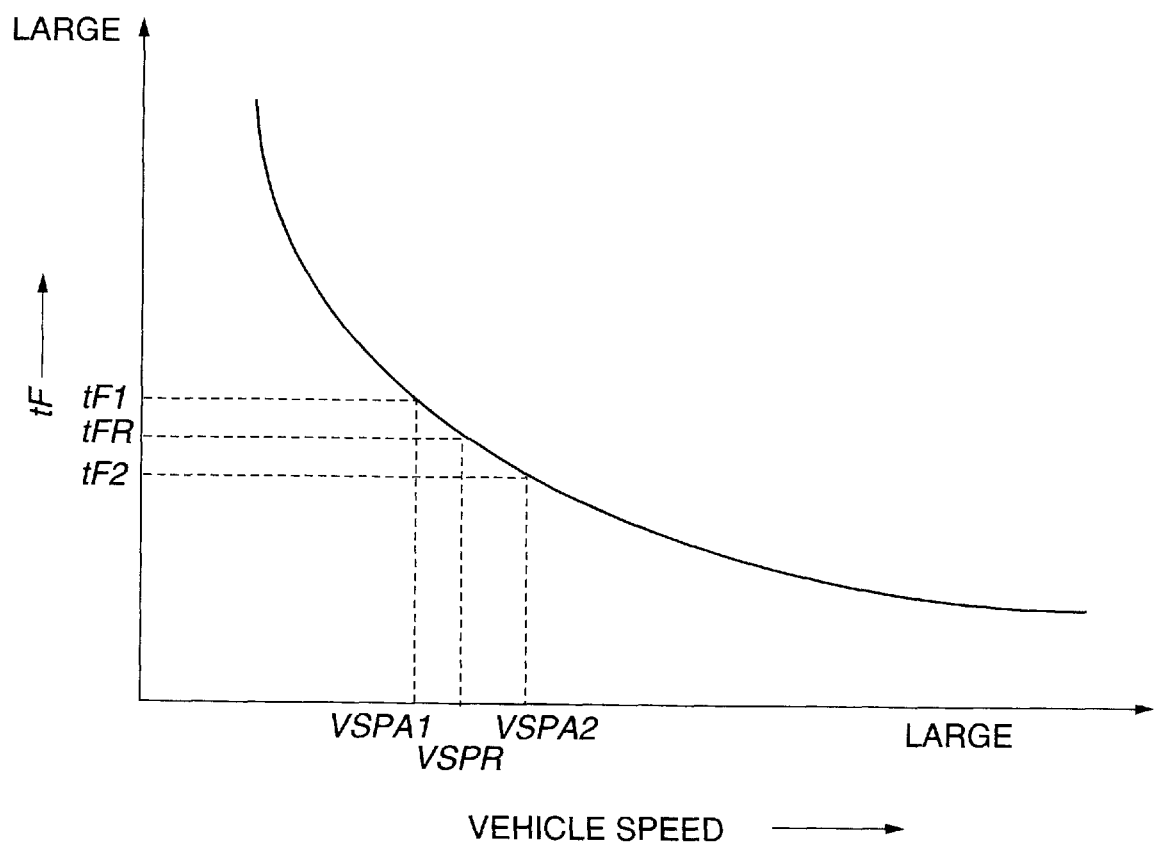
FIG. 11 is a diagram describing a map of the target output torque tF of the automatic transmission stored in the controller according to the third embodiment of this invention.

Referring to FIG. 10, in a step S11, the hysteresis processing section 15 determines whether or not the vehicle is accelerating based on variation in the vehicle speed VSP detected by the vehicle speed sensor 21.

When the vehicle is accelerating, in a step S12, a hysteresis amount is set to a negative constant H1. After the process in the step S12, the routine proceeds to a step S14.

In the step S11, when it is determined that the vehicle is not accelerating, the routine proceeds to a step S13. In the step S13, the hysteresis amount is set to a positive constant H2. After the processing in the step S13, the routine proceeds to a step S14. f In the step S14, the hysteresis amount calculated in the step S12 or the step S13 is added to the vehicle speed VSP in order to calculate the modified vehicle speed VSPA. After executing the step S14, the routine is terminated.

This routine allows the modified vehicle speed VSPA when the vehicle is accelerating to be less than the vehicle speed VSP, and the modified vehicle speed VSPA when the vehicle is not accelerating to be larger than the vehicle speed VSP.

The controller 3 calculates a target output torque tF of the automatic transmission 5 by referring to a pre-stored map 16 based on the modified vehicle speed VSPA set in the above manner. The characteristics of the map 16 will be described with reference to FIG. 11.

In a real vehicle speed VSPR, the modified vehicle speed VSPA when the vehicle is accelerating is set to VSPA1 and the modified vehicle speed VSPA when the vehicle is not accelerating is set to VSPA2. The modified vehicle speed VSPA1 during acceleration is smaller than the real vehicle speed VSPR. The modified vehicle speed VSPA2 when the vehicle is not accelerating is larger than the real vehicle speed VSPR. The target output torque tF at a certain accelerator pedal depression amount APO is basically set to decrease in response to increases in the vehicle speed VSP in the same manner as the first and second embodiments. Thus a target output torque tF1 corresponding to the modified vehicle speed VSPA1 is larger than a target output torque tF2 corresponding to the modified vehicle speed VSPA2.

Referring again to FIG. 5, the curved line of the target drive force tFd applied during deceleration is positioned substantially on a lower side of the broken line showing the output torque of the automatic transmission 5 when the relation of the accelerator pedal depression amount APO and the engine output torque is fixed. Thus the target drive force tFd during deceleration falls below a drive force which can be reached at an equal accelerator pedal depression amount. When the target drive force tFd is set on the basis of these characteristics, for all accelerator pedal depression amounts, the drive force during deceleration is not saturated until the accelerator depression amount reaches a value of 8/8. On the other hand, when applying the same target drive force during acceleration, the drive force corresponding to the difference from the broken line becomes ineffective. In other words, in spite of the fact that it is possible to obtain a larger drive force at the same accelerator pedal depression amount, the drive force can not be used for acceleration since the target drive force is set to a low level.

In this embodiment, the differential between the curved line of the target drive force tFd and the broken line can be used by setting the target output torque tF1 for non-acceleration conditions to a larger value that the target output torque tF2 by using the modified vehicle speed VSPA which incorporates the hysteresis amount. That is to say, saturation of the vehicle drive force during depression of the accelerator pedal 25 is prevented while a maximum possible drive force can be obtained during acceleration.

Instead of making the hysteresis amount set in the step S12 a negative constant, a negative variable may be used which depends on the acceleration/deceleration state of the vehicle, the vehicle speed VSP or the accelerator pedal depression amount APO. In the same manner, instead of making the hysteresis amount set in the step S13 a positive constant, a positive variable may be used which depends on the acceleration/deceleration state of the vehicle, the vehicle speed VSP or the accelerator pedal depression amount APO.

The contents of Tokugan 2000-363119, with a filing date of Nov. 29, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A vehicle drive system, comprising
   an accelerator pedal;
   a sensor which detects a vehicle speed;
   a sensor which detects a depression amount of the accelerator pedal;
   an engine varying output torque in response to a signal;
   a stepwise automatic transmission connected to the engine, the transmission performing an upshift operation at an upshift timing set according to the depression amount and the vehicle speed and a downshift operation at a downshift timing set according to the depression amount and vehicle speed, the vehicle speed corresponding to the upshift timing being set to be larger than the vehicle speed corresponding to the downshift timing for an identical depression amount; and
   a programmable controller programmed to:
      compare the depression amount with a predetermined depression amount;
      set a first target output torque to a transmission target output torque of the automatic transmission when the depression amount is smaller than the predetermined depression amount, the first target output torque increasing at a predetermined rate of increase as the depression amount increases;
      set a second target output torque to the transmission target output torque of the automatic transmission when the depression amount is larger than the predetermined depression amount, the second target output torque increasing at a rate of increase larger than the predetermined rate as the depression amount increases;
      calculate an engine target output torque based on the transmission target output torque; and
      output the signal corresponding to the engine target output torque to the engine.

2. The vehicle drive system as defined in claim 1, wherein the rate of increase of the second target output torque and the rate of increase of the first target output torque are set to values that do not cause the transmission target output torque when the depression amount takes a maximum value to exceed a maximum output torque of the transmission.

3. The vehicle drive system as defined in claim 1, wherein the controller is further programmed to set the first target output torque based on an output torque of the automatic transmission obtained immediately before a downshift timing when the relation of the depression amount and the engine target output torque is fixed, and set the second target output torque based on an output torque of the automatic transmission obtained immediately before an upshift timing when the relation of the depression amount and the engine target output torque is fixed.

4. A vehicle drive system, comprising
an accelerator pedal;
a sensor which detects a vehicle speed;
a sensor which detects a depression amount of the accelerator pedal;
an engine varying an output torque in response to a signal;
a stepwise automatic transmission connected to the engine, the transmission performing an upshift operation at an upshift timing set according to the depression amount and the vehicle speed and a downshift operation at a downshift timing set according to the depression and vehicle speed, the vehicle speed corresponding to the upshift timing being set to be larger than the vehicle speed corresponding to the downshift timing for an identical depression amount; and
a programmable controller programmed to:
  store a map of a transmission target output torque set to decrease as the vehicle speed increases;
  determine from a variation in the vehicle speed whether or not a vehicle is accelerating;
  calculate a modified vehicle speed, when the vehicle is accelerating, by subtracting a predetermined amount from the vehicle speed;
  calculate the transmission target output torque by applying the modified vehicle speed to the map;
  calculate an engine target output torque based on the transmission target output torque; and
  output the signal corresponding to the engine target output torque to the engine.

5. The vehicle drive system as defined in claim 1, wherein the controller is further programmed to calculate the modified vehicle speed, when the vehicle is not accelerating, by adding another predetermined amount to the vehicle speed.

6. A vehicle drive system, comprising
an accelerator pedal;
means for detecting a vehicle speed;
means for detecting a depression amount of the accelerator pedal;
an engine varying output torque in response to a signal;
a stepwise automatic transmission connected to the engine, the transmission performing an upshift operation at an upshift timing set according to the depression amount and the vehicle speed and a downshift operation at a downshift timing set according to the depression amount and vehicle speed, the vehicle speed corresponding to the upshift timing being set to be larger than the vehicle speed corresponding to the downshift timing for an identical depression amount;
means for comparing the depression amount with a predetermined depression amount;
means for setting a first target output torque to a transmission target output torque of the automatic transmission when the depression amount is smaller than the predetermined depression amount, the first target output torque increasing at a predetermined rate of increase as the depression amount increases;
means for setting a second target output torque to the transmission target output torque of the automatic transmission when the depression amount is larger than the predetermined depression amount, the second target output torque increasing at a rate of increase larger than the predetermined rate as the depression amount increases;
means for calculating an engine target output torque based on the transmission target output torque; and
means for outputting the signal corresponding to the engine target output torque to the engine.

7. A drive force control method for a vehicle drive system, the system comprising an accelerator pedal, a sensor which detects a vehicle speed, a sensor which detects a depression amount of the accelerator pedal, an engine varying output torque in response to a signal, a stepwise automatic transmission connected to the engine, the transmission performing an upshift operation at an upshift timing set according to the depression amount and the vehicle speed and a downshift operation at a downshift timing set according to the depression amount and vehicle speed, the vehicle speed corresponding to the upshift timing being set to be larger than the vehicle speed corresponding to the downshift timing for an identical depression amount, the method comprising:
compare the depression amount with a predetermined depression amount;
set a first target output torque to a transmission target output torque of the automatic transmission when the depression amount is smaller than the predetermined depression amount, the first target output torque increasing at a predetermined rate of increase as the depression amount increases;
set a second target output torque to the transmission target output torque of the automatic transmission when the depression amount is larger than the predetermined depression amount, the second target output torque increasing at a rate of increase larger than the predetermined rate as the depression amount increases;
calculate an engine target output torque based on the transmission target output torque; and
output the signal corresponding to the engine target output torque to the engine.

* * * * *